Sept. 14, 1943.  D. C. SCOTT  2,329,679
RECORDING MEANS FOR TESTING MACHINES
Filed Jan. 30, 1941  3 Sheets-Sheet 1
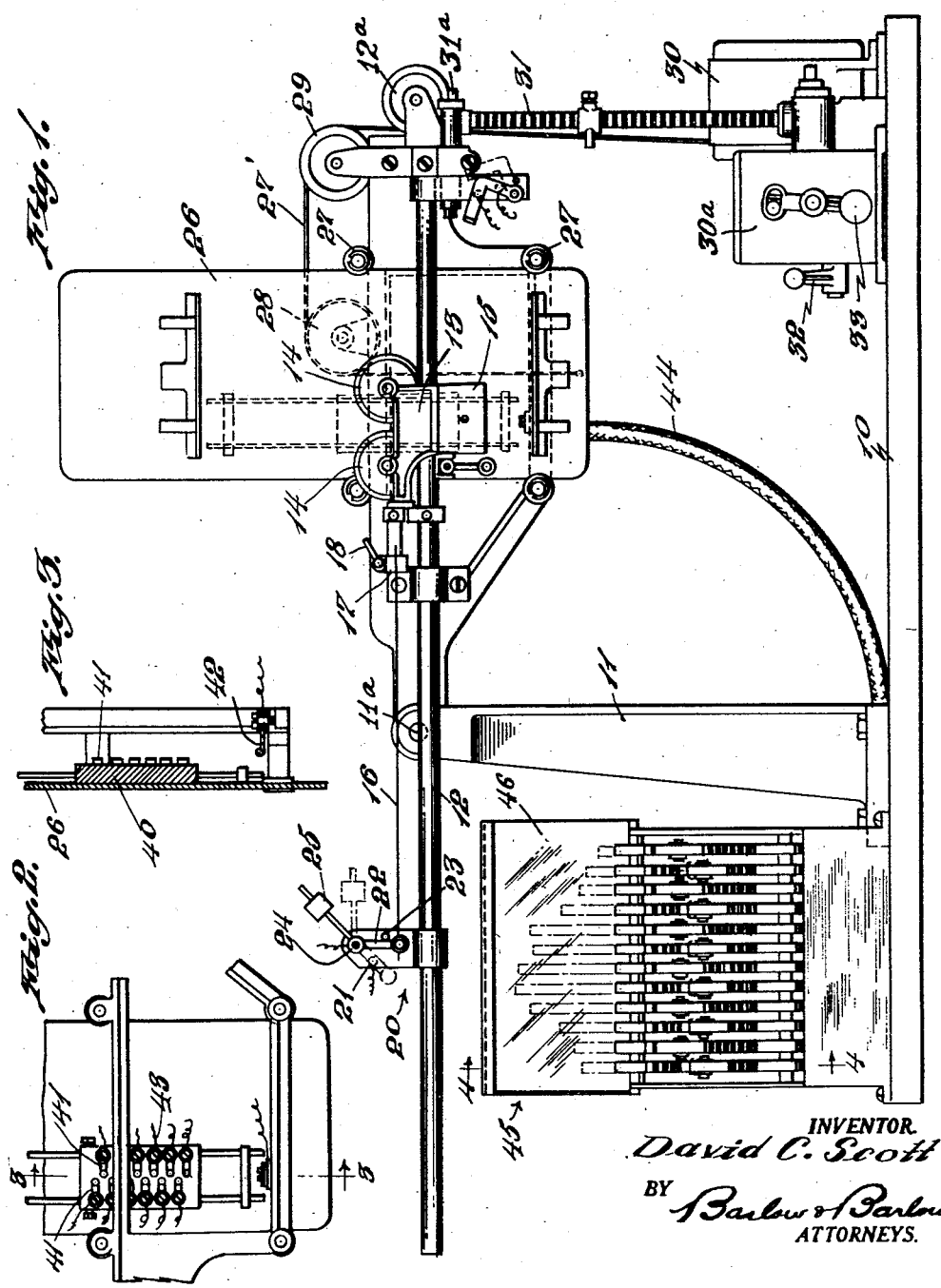
INVENTOR.
David C. Scott
BY Barlow & Barlow
ATTORNEYS.

Sept. 14, 1943.                D. C. SCOTT                2,329,679
                  RECORDING MEANS FOR TESTING MACHINES
                  Filed Jan. 30, 1941        3 Sheets-Sheet 2
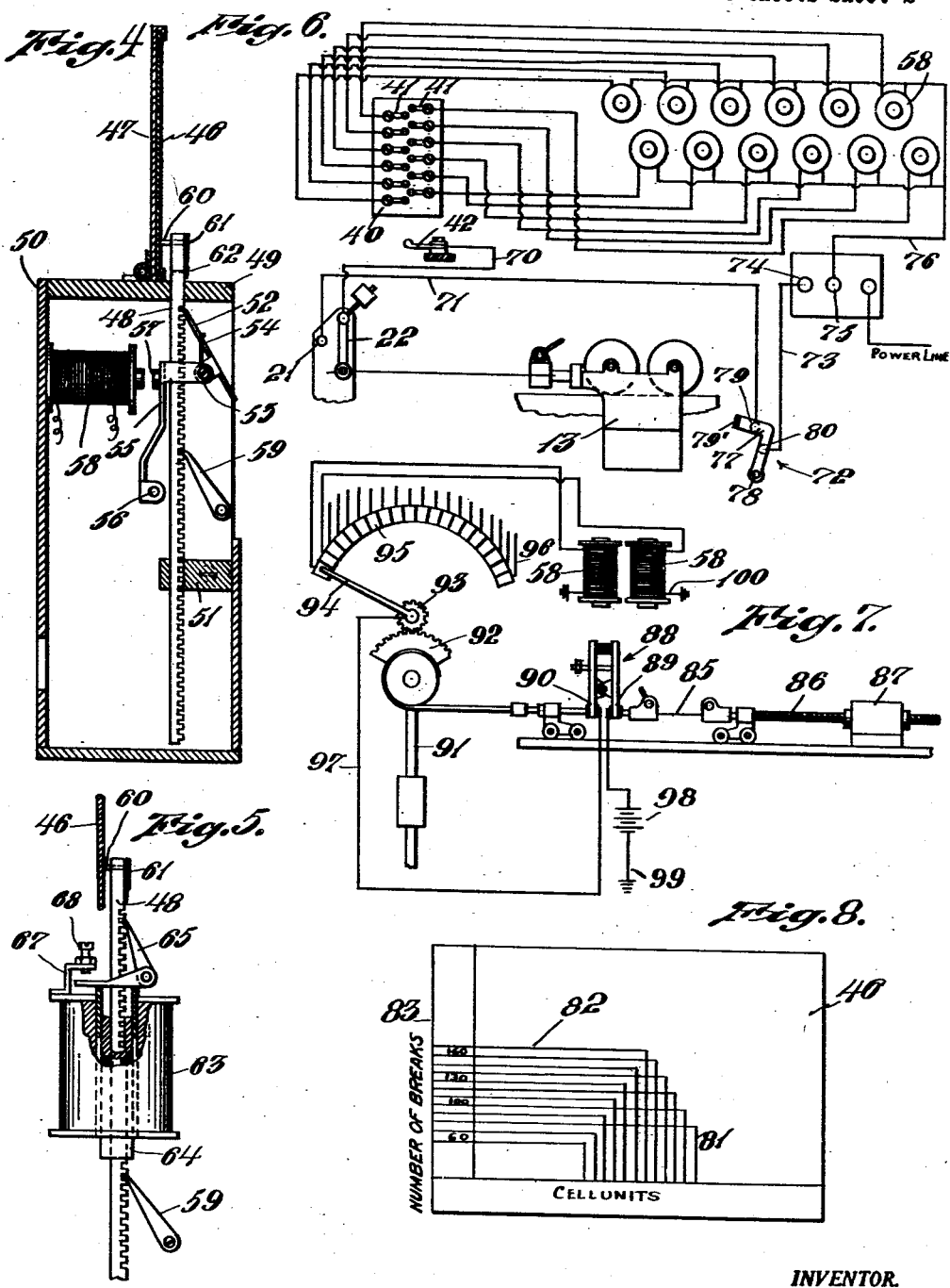
INVENTOR.
David C. Scott
BY Barlow & Barlow
ATTORNEYS.

Sept. 14, 1943.　　　D. C. SCOTT　　　2,329,679
RECORDING MEANS FOR TESTING MACHINES
Filed Jan. 30, 1941　　　3 Sheets-Sheet 3
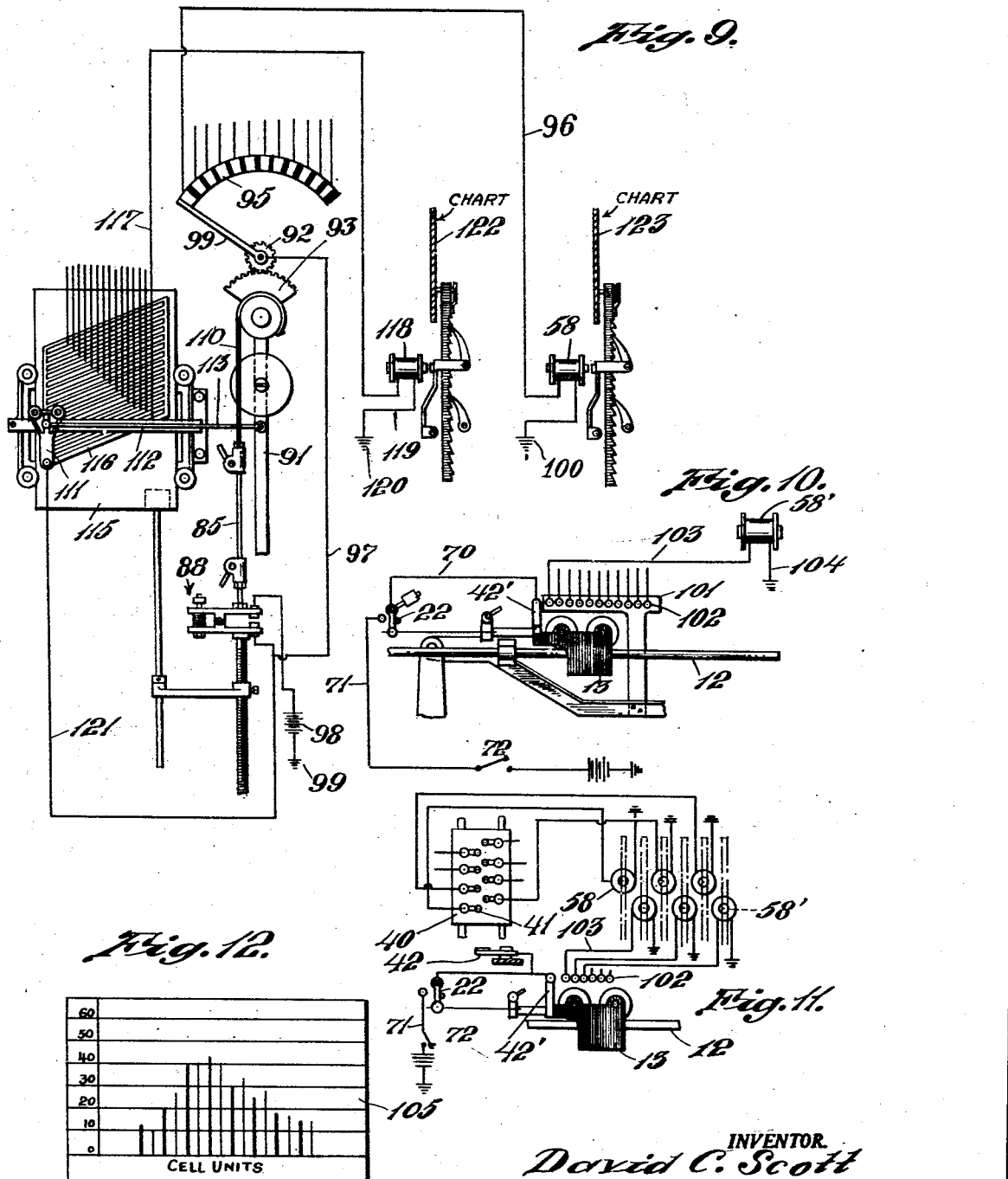

Patented Sept. 14, 1943

2,329,679

UNITED STATES PATENT OFFICE 2,329,679

RECORDING MEANS FOR TESTING MACHINES

David C. Scott, Providence, R. I., assignor to Henry L. Scott Company, a corporation of Rhode Island Application January 30, 1941, Serial No. 376,643

12 Claims. (Cl. 265—2)

This invention relates to a testing apparatus, more particularly to the recording of a series of tests of the same type on different specimens, one test being made on each of the different specimens and completed before the next specimen is tested.

Usually in the testing of a series of specimens for one observation on each of the specimens, data is accumulated in the order of the successive tests performed which later must be grouped according to magnitude in order that the information which is desired from the test may be had. Such information may then be presented in various forms such, for instance, as the showing of the repetition of like occurrences in the tests, all of which is a laborious function and one which is not ordinarily available until some time after the series of tests is performed.

One of the objects of this invention is the recording automatically the information obtained in the desired form as it must eventually be presented so that as an individual test of a plurality of specimens is progressing the accumulated results of the completed tests may be presented in the desired form to be observed.

Another object of the invention is to make possible the desired presentation of the data for any series of tests at some location remote from the machine where the tests are applied.

Another object of the invention is to so record these tests that the frequency of similar or like behavior of the different specimens may be readily visible as for instance on a chart and when drawn from the machine, the chart will show lines running to a frequency ordinate for this purpose.

With these and other objects in view, the invention consists in certain novel features of construction, as will be more fully described and particularly pointed out in the appended claims.

In the accompanying drawings:

Fig. 1 is an elevation illustrating a testing machine and a recording chart associated therewith by being connected thereto through an electrical cable;

Fig. 2 is a rear view of the platen on the machine;

Fig. 3 is a section on line 3—3 of Fig. 2;

Fig. 4 is a sectional view on substantially line 4—4 of Fig. 1;

Fig. 5 is a sectional view of a modification illustrating an operating rack associated with a solenoid;

Fig. 6 is a wiring diagram of the parts;

Fig. 7 is a schematic view of a modified arrangement of a similar device;

Fig. 8 is a plan view of a chart such as might be formed from the mechanism herein illustrated;

Fig. 9 is a diagrammatic view similar to Fig. 7, showing an arrangement for recording both the load characteristics and elongation characteristics of a specimen;

Fig. 10 is a view similar to Fig. 6, but showing elongation recorded rather than load;

Fig. 11 is a diagrammatic view incorporating the features of recording both load and elongation as shown in Figs. 6 and 10;

Fig. 12 is a plan view of a chart made in the arrangement shown in Fig. 11.

In carrying forward this invention an apparatus is used for testing one specimen which is followed by the same test on another specimen and so on until all of the specimens to be tested have been so tested. The results of the tests are automatically recorded by grouping similar results in divisions of maximum and minimum range of the tests to be performed. A member in the testing machine moves over a certain range in response to the magnitude of the test performed. This range is split up into as many divisions as desired and a recording device is set up with as many indicating members as there are divisions, with one member responsive to the completion of a test in one division of the range and another member responsive to the completion of a test in another division of the range and so on. The indicating members will be arranged in the sequence of the divisions of the range of the tests that a graphic pattern may be produced.

With reference to the drawings, I have illustrated a testing device similar to that provided in my Patent No. 2,205,579, dated June 25, 1940, operable to progressively load a specimen being tested and which in general consists of a base 10 from which a standard 11 rises upwardly to pivotally support at 11a a beam having a single track 12 thereon upon which a carriage 13 may roll by means of its wheels 14 supported thereby. This carriage is weighted as at 15. The specimen to be tested is designated 16 and is clamped to the carriage by clamp 17 actuated by handle 18, while the other end of the specimen is clamped in a device designated generally 20 which is fixed on the beam or track 12 and tilts therewith. This device 20 has an electrical contact 21 and a lever pivoted as at 24 having an arm 22 limited in its movement by stop pin 23 and provided with a work clamp and another arm extending from the pivot 24 is provided with a weight 25. The beam is supported at its free end through an anti-friction roll 12a on a platform 31a fixed to the upper end of a rack 31 which engages a pinion controlled by a gear box 30a in which there is provided a gearing mechanism driven by the electric motor 30 which runs continuously. This gearing mechanism is manually controlled through a clutch and reversing mechanism by means of lever arms 32—33. At the proper setting of the arms 32—33 the gearing mechanism will be set into motion to move the rack 31 downwardly which action will permit the beam or track 12 to swing downwardly about its pivot 11a by gravity action. In this situation the carriage 13 will be free to move along the track 12 to load the specimen being tested. Greater detail of this mechanism is found in applicant's above-mentioned Patent No. 2,205,579. As the specimen 16 is tensioned, the weight 25 is held in the elevated position shown in full lines. However, upon breaking of the specimen by a progressive application of weight thereto, the arm 22 is moved by weight 25 into the dotted line position shown in Fig. 1 so that the arm 22 engages the contact 21 for the completion of an electric circuit which will be hereinafter described.

A platen 26 is mounted by rollers 27 on the framework of the beam and movable therewith and is held in raised position by cord 27' extending over pulleys 28, 29 and fastened to some part fixed with relation to the base 10. Thus, as the beam moves downwardly to progressively load the specimen, the platen will also move relative to and across the beam to record the load applied and elongation characteristics of the specimen.

On the back of the platen 26 I have mounted a contact block 40 (see Figs. 2 and 3) having a series of contacts 41 located in staggered relation for the sake of close spacing along the block, while there is a contact arm 42 secured to the framework of the tilting beam which will wipe over these contacts as the platen descends. These contacts are so spaced that one of them will engage the arm 42 throughout the entire range of the test from maximum to minimum to which any one of the specimens is liable to be subjected, and by the proper spacing of the plurality of contacts, I divide the range of test between maximum and minimum force applied into divisions each of which corresponds to a particular portion of the range of test and these divisions I term cells.

Contact 41 is connected by a separate wire, as 43 in the cable 44, to the recording device, which is designated generally 45 (Fig. 1). This recording device may be located at any distance from the machine and consists of a graduated chart 46 suitably mounted as at 47 and a series of units for operating upon this chart arranged in a row and each corresponding to one of the cells, each unit being connected by one of the wires 43 to one of the contacts 41 in a corresponding sequence. Each of these units, see Fig. 4, consists of a rack 48 guided in the top wall 49 of a casing 50 by means of the bracket 51 within the casing. An arm 55, pivoted as at 56, has an armature portion 57 to be drawn toward the electro-magnet 58 when electrically energized. This arm carries a pawl 52 which is pivoted as at 53 and urged toward the teeth of the rack by spring 54. Electroenergization causes the pawl 52 to move the rack upwardly a certain distance, and it is held from falling back by the locking pawl 59.

A pencil 60 is urged toward the chart 46 by spring 61 riveted as at 62 in the arm 48. In some cases, it may be desirable to have a different type of actuation for the rack 48; and in Fig. 5 I have provided an electro-magnet 63 through which the rack 48 extends, the armature being designated 64 which acts as a core for the solenoid magnet so that, upon actuation, the pawl 65 will be moved to cause the rack to rise. A limit stop 67, adjustable as at 68, is provided for the rack in each instance of energization.

The wiring diagram for the hook-up of this apparatus is shown in Fig. 6, where it will be observed that there is a series of contacts 41 which are connected serially to the magnets 58 as may be easily traced through the wires illustrated in this figure. The wiping contact arm 42 is illustrated as connected through the lead wire 70 to the arm 22 of the clamp, while the wire 71 extends from the contact 21 through a switch designated generally 72 from whence wire 73 extends to one terminal 74 of a source of supply, while the other terminal 75 of this source of supply is connected by wire 76 to a common lead to the other side of each of the magnets. The switch 72 is in the line 71, 73 and consists of an arm 77 pivoted as at 78 on the tiltable beam which has an abutment 79 with which the carriage will engage when the specimen 16 breaks, and the carriage moves to the end of its travel so as to disconnect the line 71, 73 which is bridged by this arm 77 across contacts 79 and 80.

One of these units only may be used in testing any one specimen. Nothing happens in the recorder until a specimen breaks, then some one of the actuating magnets 58 will rack up its unit 48 one notch, to make a vertical line of corresponding length on chart 46. The position of wiper 42 along staggered contacts 41, when this particular specimen breaks, will determine which one of the plurality of actuating magnets 58 will be energized to produce this result. The next specimen tested, when its progressively applied breaking load is reached, may select the same actuating magnet 58 or a different one than did its preceding specimen. If it happens to select the same magnet 58, its rack 48 will be advanced one more notch, meaning that two completely tested specimens have advanced this particular rack two notches. Referring to chart 46 (Fig. 1) and assuming the condition stated, let us assume that this particular rack 48 is the one furthest to the left, shown in dot-and-dash line to be advanced two notches. The next rack is shown advanced, let use assume, three notches; the next one four notches, etc. Of the twelve racks illustrated in their different advanced positions, let us assume further that their advanced positions represent a total of forty-eight specimens individually tested for their load or breaking strengths. One of the forty-eight broke at one unit of load; a few at two units of load; a few more at three units of load, etc. By noting the final advanced position of each of the racks, an operator would be able to count how many breaks were represented by the attained position of the first rack in the series; how many by the second rack; by the third, fourth, etc., and thus he would be able to approximate the number of specimens that broke at some particular load; the number that broke at some other load, etc. Thus he would be able to estimate the proportionate strengths of the total of his forty-eight specimens tested.

In some cases instead of utilizing an actuating device which I have here illustrated on a machine of the type here illustrated, I might desire to use a machine such as shown in Patent No. 1,911,006, dated May 23, 1933, and in this case I would provide a pull as indicated in Fig. 7 on the specimen 85 by means of the threaded rod 86 and gear box 87. A clamp designated generally 88 of the type illustrated in Patent No. 1,599,254 might be utilized so that, should the specimen break, the contacts 89 and 90 would close to complete an electric circuit. In this case, the pendulum arm 91 would be equipped with a gear segment 92 to acuate pinion gear 93 which carries an arm 94 to wipe over a commutator segment 95 from which a plurality of wires 96 may lead to different magnets, such as 58, while the wiper arm 94 would be equivalent to the arm 42, and the circuit would be similar to that which I have above indicated in detail. The wire 97 in this case from the wiper arm 94 passes to the clamp switch 88 and then to a source of power 98 which is grounded as at 99, while the other end of the armature line is also grounded as at 100.

Up to this point the specification has referred to the use of my improvement in connection with the recording of the cell in which a certain break of specimen occurs in response to the load. It will, however, be apparent that an arrangement may be had for the collecting of data as to elongation characteristics of the specimen; and in Fig. 10 I have shown the carriage 13 as being equipped with a wiper arm 42' which will move over a block 101 carrying contacts 102 each of which is connected to an electro-magnet 58' by means of wire 103 the other side of which is grounded as at 104. The circuit is completed from the arm 42' through the same arrangement as heretofore described in connection with Fig. 6; namely, wire 70, switch 22, line 71 switch 72, etc. In this arrangement it will be apparent that the extent of movement of the carriage 13 along the beam 12 at the instant of the break of the specimen will thus be recorded, and thus the magnitude of stretch will be recorded.

In some cases it may be desirable to collect both the data obtained by the arrangement shown in Fig. 6 and the data obtained from an arrangement such as shown in Fig. 10. In this case I may equip a machine such as shown in Fig. 11 with apparatus for collecting both test results. Here, the block 40 is provided with a plurality of different contacts 41, wiper arm 42, etc., just as shown in Fig. 6, which will move over the block 40 as it moves with the platen 26; whereas in the same machine the carriage 13 is equipped with the wiper arm 42' to move over the contacts 102 over block 101, etc., as shown in Fig. 10, that the data as to magnitude of elongation may also be collected at the same time. The switch 22 may have a common lead 71, controlled by some switch 72, to a source of power and then be grounded. The different contacts 41 will be connected to different electro-magnets 58 so that the electro-magnets of the units which are arranged in sequence corresponding to the cells may be actuated; while the lines 103 from the contacts 102 will be connected to other electro-magnets 58' in a different series to be actuated for the other set of data to be collected. The electro-magnet of the unit corresponding to the cell where the break occurs will be actuated when the specimen breaks. These electro-magnets may be in staggered arrangement, as shown in Fig. 11, and each arranged to actuate a rack 48 such as heretofore described in connection with Figs. 1, 4, and 5; and both may be arranged to make a mark on the same record sheet 105, as shown in Fig. 12. However, the units and the marks which are made by the units to record elongation will distinguish from the units and the marks made by the units which record load characteristics such, for instance, as one being wider than the other, or one being of a different color than the other, so that the distinction will be readily apparent on the chart 105 such as shown in Fig. 12 or in viewing the two. It will, of course, be readily apparent that these units operated by electro-magnets 58' might be entirely separate and on a different chart than the units operating from electro-magnets 58, but in many instances it is desirable that they be on the same chart, and I have so indicated the invention in this particular instance.

In Fig. 9, the arrangement shown supplements the showing in Fig. 7. In Fig. 7, the breaking of the specimen at a particular load is recorded by the segments 95 and electro-magnets 58. Elongation may be desired to also be recorded in an instrument of this character, and here I employ an arrangement built upon the angular arrangement of the contact bars, to compensate for the unwrapping of the band 110. My contact or wiper arm is mounted on the carriage 111 which moves horizontally along the track 112, being drawn by the link 113 attached to the swinging arm 91. The same numerals are applied to the parts of the machine corresponding to the parts shown in Fig. 7, except it will be apparent that the machine shown here is arranged vertically instead of horizontally. The platen 115 moves vertically downwardly and carries diagonally-arranged bars 116 each of which is connected by wire 117 to an armature 118 (one of the many being here shown) which actuates a unit such as shown in Fig. 4 as described. The lead from the coil 118 is designated 119 and is grounded as at 120, the circuit being completed similarly to that shown in Fig. 7 where there is a power source 98 connected to the ground 99 leading through switch 88 connected to the specimen, and thence connected to the wiper arm by the lead 121. In this embodiment of the invention I have shown the elongation characteristics as recorded on the chart 122, while the load characteristics are recorded on chart 123, the charts being separate, although it will be readily apparent that a single chart might be used in the arrangement of the magnets as shown in Fig. 11. It will be readily apparent that the angulation of the bars 116 in the movement of the platen downwardly will compensate for the unwrapping of the strap 110 to provide a true picture of the elongation behavior of the specimen.

Now referring to Fig. 8, it will be seen that in this representation of a chart that the behavior of each specimen of a plurality of specimens can be compared side by side. For example let it be assumed that the numerals appearing on the left marginal portion represent vertical divisions of the chart and that each division indicates one complete test. Thus the space between the horizontal base line and the next horizontal line would contain 60 completed tests. The space between the base line and upper horizontal line would contain 160 divisions or completed tests. Now it will be apparent that in the range of tests contained within the first cell represented by the first of the series of unequal lines, 60 specimens were, for instance, fractured or broken, and that 160 specimens were fractured or broken in the range of test contained within the cell represented by the seventh line from the left of the series of vertical lines 81.

I claim:

1. In a testing apparatus, means for applying a force on a specimen being tested, members on said apparatus movable relative to each other by the actuation of said means, means for recording the result of such test comprising spaced contacts carried by one of said members dividing the range of load applied to the specimens into a plurality of cells, separate units in said recording means each corresponding to one of said cells, a contact arm carried by the other of said members and wiping over said contacts as the test on a specimen proceeds, electric circuits to said recording units, and means to close one of said circuits through the contact engaged upon completion of the test of a specimen for actuating the corresponding unit in said recording means.

2. In a testing apparatus, means for applying a force on a specimen being tested, a member movably mounted and movable by the actuation of said means, a recorder for automatically recording the like behavior in groups of a plurality of specimens tested, comprising a pulrality of elements in juxtaposition and each mounted for independent movement with respect to each other, means for moving said elements step by step, and means in part carried by said member for actuating the second said means upon the rupture of a specimen being tested to move one of said elements.

3. In a testing apparatus, means for performing the physical test on any of a plurality of specimens by loading the same and associated means for permanently recording the result of such test, means for dividing the range of the load to be applied into a plurality of cells, each representing a portion of the said range, a separate unit in said recording means corresponding to each of said cells, a chart and means responsive to the completion of the test on a specimen for actuating the unit in said recording means which corresponds to the cell in which such completed test occurred for recording such completion of test in said cell.

4. In a testing apparatus, means for performing the physical test on any of a plurality of specimens by loading the same and remotely associated means for permanently recording the result of such test, contacts in the testing means dividing the range of the load to be applied into a plurality of cells, each representing a portion of said range, a separate unit in said recording means corresponding to each of said cells, a contact arm associated with the testing means wiping over said contacts as the test on a specimen proceeds, electric circuits to said recording units, a chart and means to close an electrical circuit including the contact engaged at the time of completion of the test of a specimen for actuating the corresponding unit in said recording means for recording on said chart such completion of test in said cell.

5. In a testing apparatus, means for performing the physical test on any of a plurality of specimens by loading the same and associated means for recording the result of such test, means for dividing the range of the load to be applied into a plurality of cells, a separate unit in said recording means corresponding to each of said cells, a chart and means responsive to the completion of the test on a specimen for actuating the unit in said recording means corresponding to the cell in which said completed test occurred for recording on said chart such completion of test, said units being in aligned relation and exposed to view in all their different positions whereby the recurrence of the operation of each circuit may be observed at any point in the progress of the test.

6. In a testing apparatus, means for performing the physical test on any of a plurality of specimens by loading the same and remotely associated means for recording the result of such test, spaced contacts in the testing means dividing the range of the load to be applied into a plurality of cells, each representing a portion of the said range, a separate unit in said recording means corresponding to each of said cells, a chart, a contact arm in the testing means wiping over said contacts as the test on a specimen proceeds, electric circuits to said recording means, means to close an electrical circuit including the contact engaged at the time of completion of the test of a specimen for actuating the unit in said recording means corresponding to the cell in which said completed test occurred for recording on said chart such completion of test, said units being in aligned relation and exposed to view in all their different positions whereby the recurrence of the operation of each unit may be observed at any point in the progress of the test.

7. In a testing apparatus, means for performing the physical test on any of a plurality of specimens by loading the same and associated means for recording the result of such test, means for dividing the range of the load to be applied into a plurality of cells each representing a portion of the said range, a separate unit in said recording means corresponding to each of said cells, a chart, means responsive to the completion of the test on a specimen for actuating the unit in said recording means, corresponding to the cell in which said completed test occurred, said recording means including a chart and means on each unit to mark on said chart, said chart being movable at right angles to the movement of said marker means for drawing lines thereon for convenience in reading said chart.

8. In a testing apparatus, means for performing the physical test on any of a plurality of specimens by loading the same and remotely associated means for recording the result of such test, spaced contacts in the testing means dividing the range of the load to be applied into a plurality of cells, a separate unit in said recording means corresponding to each of said cells, a contact arm in the testing means wiping over said contacts as the test on a specimen proceeds, electric circuits to said recording means, means to close an electrical circuit including the contact engaged by the contact arm at the time of completion of the test of a specimen for actuating the unit in said recording means corresponding to the cell in which said completed test occurred, and means to disconnect each of such energized circuits upon completion of a test of a specimen.

9. In a testing apparatus, means for performing the physical test on any of a plurality of specimens by loading the same and associated means for recording the result of such test, separate means for dividing each of a plurality of ranges of the load to be applied into a plurality of cells each representing a portion of one of the plurality of said ranges, a separate unit in said recording means corresponding to each of said cells, and means responsive to the completion of the test on a specimen for actuating the unit in said recording means corresponding to the cell in which said completed test occurred, said units in one range having distinguishing characteristics from those in another range.

10. In a testing apparatus, means for performing the physical test on any of a plurality of specimens by loading the same and remotely associated means for recording the result of such test, one set of spaced contacts in the testing means dividing one range of the load to be applied into a plurality of cells each representing a portion of the said one range, another set of spaced contacts in the testing means dividing another range of the load to be applied into a plurality of cells each representing a portion of the other range, separate recording means for each of said ranges of test, a separate unit in each of said recording means corresponding to each of said cells, a contact arm in said testing means wiping over one set of contacts, and a second contact arm in said testing means wiping over the other set of contacts as the test on a specimen proceeds, electric circuits to said recording units, and means to close an electrical circuit including each of the contacts engaged at the time of completion of the test of a specimen for actuating each of the units in each of said recording means corresponding to the cells in which said completed test occurred.

11. In a testing apparatus, means for performing the physical test on any of a plurality of specimens by loading the same, and associated means for permanently recording the result of such test, means for dividing the range of the load to be applied into a plurality of cells each representing a portion of the said range, a separate unit in said recording means corresponding to each of said cells, a chart, and means responsive to the failure of a specimen to complete said test for actuating the unit in said recording means corresponding to the cell in which such failure occurred for recording such failure on said chart.

12. In a testing apparatus, means for performing a test on the work and associated means for recording the result of such test, separate means for dividing each of a plurality of characteristics of performance of the specimens to be tested into a plurality of cells, a separate unit in said recording means corresponding to each of said cells, means responsive to the completion of the test on a specimen in any one cell in each range of characteristics for actuating the corresponding unit in said recording means, the units corresponding to one characteristic distinguishing from those of another characteristic, and means for recording the two tests on the same chart.

DAVID C. SCOTT.